United States Patent [19]

Segal

[11] 4,390,489

[45] Jun. 28, 1983

[54] METHOD OF SHAPING THERMOPLASTIC COMPOSITIONS ON ALUMINUM FOIL SUPPORT

[75] Inventor: Leon Segal, Morristown, N.J.

[73] Assignee: Allied Corporation, Morris Township, Morris County, N.J.

[21] Appl. No.: 153,244

[22] Filed: May 27, 1980

Related U.S. Application Data

[63] Continuation of Ser. No. 861,487, Dec. 19, 1977, abandoned, which is a continuation of Ser. No. 321,077, Jan. 4, 1973, abandoned.

[51] Int. Cl.³ .......................... B29D 3/02; B29F 5/00
[52] U.S. Cl. ...................... 264/126; 29/423; 72/379; 264/316; 264/322
[58] Field of Search ............... 264/320, 322, 512, 515, 264/521, DIG. 41, 555, 209, 210.1, 213, 313, 334, 338, 234, 345, 284, 293, 320, 291, 292, 517, 518, 522, 266, 316, 126; 29/423, 527.1, 527.2; 72/379

[56] References Cited

U.S. PATENT DOCUMENTS

| | | |
|---|---|---|
| 2,567,275 | 9/1951 | Colombo .......................... 425/385 |
| 2,585,915 | 2/1952 | Chauannes ........................ 425/385 |
| 3,132,980 | 5/1964 | Desmond et al. .................... 29/423 |
| 3,212,137 | 10/1965 | Lemettre ........................ 425/373 |
| 3,352,742 | 11/1967 | Zunich et al. ..................... 264/299 |
| 3,444,022 | 5/1969 | Bichsel ............................ 428/461 |
| 3,515,615 | 6/1970 | Okada et al. ..................... 428/461 |
| 3,589,961 | 6/1971 | Fordyce et al. ................... 264/293 |
| 3,594,249 | 7/1971 | Mueller-Tamm et al. ..... 156/244.24 |
| 3,621,092 | 11/1971 | Hofer .............................. 264/322 |
| 3,631,580 | 1/1972 | Swartz .............................. 29/527.2 |
| 3,775,365 | 11/1973 | Mathis et al. ..................... 260/41 R |

FOREIGN PATENT DOCUMENTS 708395 4/1965 Canada ............................. 29/432

Primary Examiner—Willard E. Hoag
Attorney, Agent, or Firm—Richard A. Negin

[57] ABSTRACT

Thermoplastic resin compositions are formed into shaped objects in a rapid-stamping process when such compositions are pre-heated and supported upon a metal foil support. The heated and relatively flowable composition is then readily transferred by means of the foil carrier to a stamping press by automatic or manual means. The thermoplastic composition may be filled and/or reinforced, and may be in the form of sheets, logs, cakes or other irregular shaped objects.

18 Claims, 9 Drawing Figures

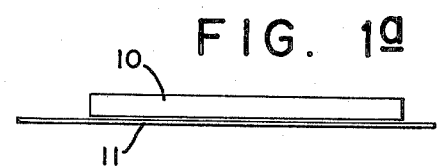
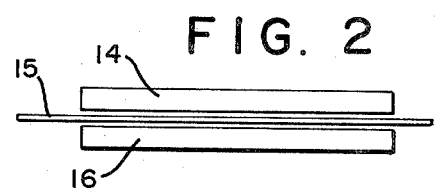
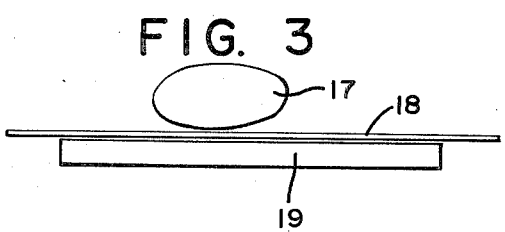
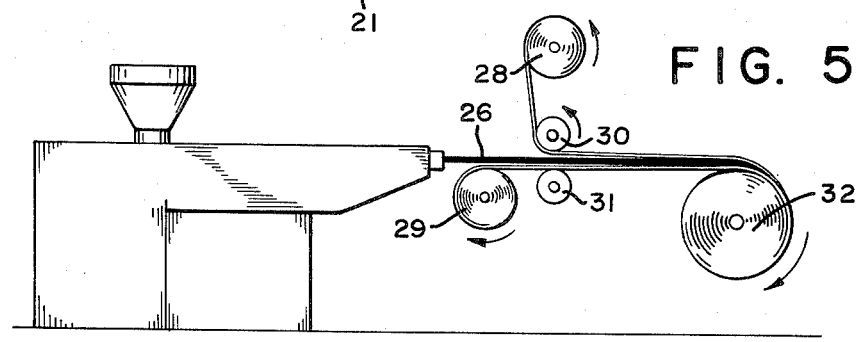
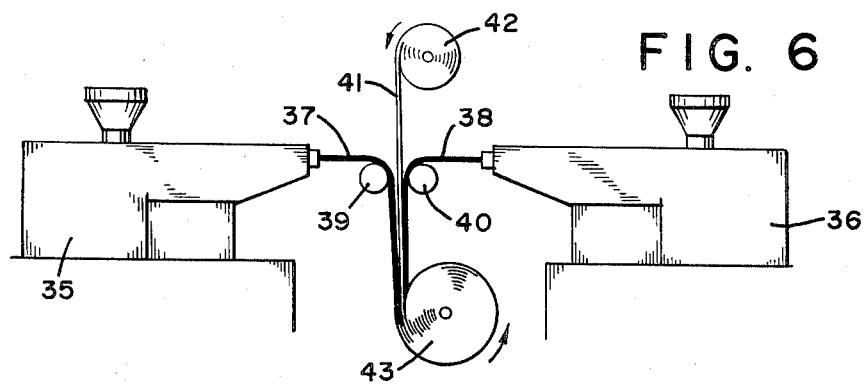
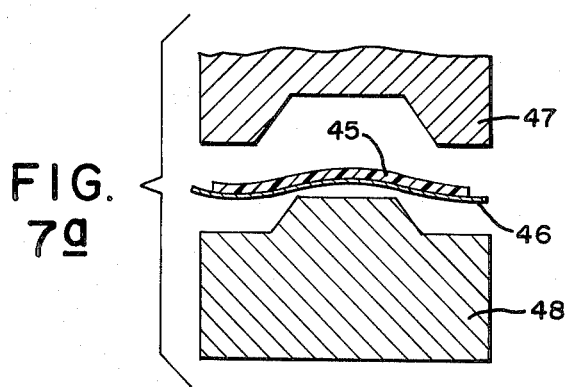
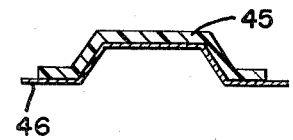

METHOD OF SHAPING THERMOPLASTIC COMPOSITIONS ON ALUMINUM FOIL SUPPORT

This is a continuation, of Application Ser. No. 861,487, filed Dec. 19, 1977, which in turn is a continuation of Application Ser. No. 321,077, filed Jan. 4, 1973, both now abandoned.

BACKGROUND OF THE INVENTION

This invention relates to a process for shaping thermoplastic articles formed in a rapid-stamping operation. More particularly, the invention relates to shaping thermoplastic compositions in which the transfer of the heated or molten polymer to a stamping press is expedited by means of a metal foil carrier or support.

It is known that many thermoplastics can be formed at ambient temperatures by means of various sheet metal-forming techniques such as deep drawing, stretch forming, stamping, etc. These relatively cold stamping processes are economically attractive because it is possible to achieve rapid production rates, e.g. rates that exceed one item every twenty seconds or even faster. In order to overcome the deficiencies of prior art compositions, e.g. dimensional instability, poor heat resistance, poor mechanical properties, reinforcement in the form of glass fibers are added to the thermoplastic composition. Such reinforced materials have higher mechanical strength, impact resistance and dimensional stability than unreinforced compositions.

The stamping of a glass mat reinforced thermoplastic sheet is described, for example, in U.S. Pat. Nos. 3,621,092 and 3,626,053. Novel variations of the basic stamping process are described, for example, in U.S. patent application Ser. Nos. 268,400, filed July 3, 1972 and 195,450, filed Jan. 11, 1971.

Basically, the rapid stamping process contemplated by the invention may be separated into the following stages:

1. Preheat of sheet or blank
2. Transfer to the rapid stamping press
3. Stamping under pressure
4. Removal or ejection from the mold In accordance with the present invention, the first two stages are modified by the utilization of a foil carrier or support, which subsequently may perform an integral function in stage 3 and/or 4.

In Stage 1, the composite sheet, blank or charge is suitably heated such as in a radiant, dielectric, infrared, convection or vacuum oven or similar heating source, to a temperature above the melting point of the thermoplastic resin component of the blank.

In Stage 2, the hot charge or blank is transferred (by means of the foil support) to a mold placed in a stamping press, wherein the mold or set of dies impart the desired configuration of the final product to the sheet or blank. The mold is maintained at a temperature between about room temperature (23° C.) and approximately 160° C. or higher, depending on the polymer constituent of the sheet and upon the desired stamping characteristics.

In Stage 3, the press is rapidly closed for a period of time sufficient to cause the blank to conform to the shape of the mold and to cool and/or crystallize sufficiently to allow part removal without distortion.

In Stage 4, the molded article is removed from the mold, allowed to cool and transferred for further assembly or packaged for shipment.

It is readily recognized that stamping parameters such as pressure requirements, residence time in the mold, pre-heat temperature, etc. are dependent upon the sheet composition, thickness, part complexity, etc., as described to a large extent in U.S. patent application Ser. Nos. 268,400, filed July 3, 1972; 194,469, filed Nov. 1, 1971; and 195,450, filed Jan. 11, 1971.

A forming process of this kind has many advantages over prior art forming methods and compositions and includes, for example, the following advantages. The cycle times are extremely fast, with a cycle time of 10–30 seconds per part, even on extremely large parts (10–20 ft$^2$ in area), being realizable.

Standard sheet-metal stamping, hydraulic or mechanical stamping presses are useable, although slight modifications may be required in the clutch assembly in order to obtain the desired pressure cycle.

The shaped articles may have complex and non-planar configuration.

Variable thickness relative to the initial charge thickness can be achieved during stamping.

Holes and notches can be formed during stamping or in post-forming operations.

The process, as previously practiced in the prior art, suffers from several deficiencies in the processing requirements. The transfer stage of the process (without the use of foil support) is a relatively clumsy and unmanageable step, often resulting in poorly formed parts. When the material is in sheet form, the sheet itself must be clamped, held, or otherwise supported during the transfer and preheat stages. Clamps or grid supports may cool, distort, puncture or otherwise damage the sheet during the pre-heat and transfer stages, resulting in an imperfect or poorly formed article. Special clamping devices, heating devices, non-stick fixtures and the like must be used to avoid large-scale damage to the pre-heated composition.

In addition, in order to keep the thermoplastic sheet intact during the physically rigorous pre-heat and transfer stages, it is necessary, in providing some integrity to the molten sheet, that some special means such as glass fiber reinforcement in the form of fibers of substantial length, usually greater than 1½", and preferably continuous in length, be used. In the absence of the long fibers or glass cloth mat, or web, practical transfer of the molten thermoplastic compositions to the mold is difficult. Thus, since temperatures in excess of the melting point are often employed to soften the interior of the sheet, unless long glass fiber reinforcement is present to retain the sheet integrity and strength during the pre-heat stage, the sheet may virtually disintegrate during the pre-heat and/or transfer stages because of insufficient integral strength in the melt when heated above the melting point. Moreover, a fairly high amount of glass mat or similar reinforcement has heretofore frequently been required in the thermoplastic sheet in order to avoid dripping of the heated thermoplastic away from the sheet. Such a high concentration of glass mat inevitably leads to a poor surface finish on the final stamped part because of fiber prominence.

Still another shortcoming of long-glass fiber-filled compositions is that they often possess poorer mechanical properties when compared to short fiber-reinforced thermoplastics. Although the reinforcement efficiency theoretically increases as the reinforcing fiber length increases, poor wetting of the fiber by the thermoplastic matrix will negate this effect. If the fibers are present in the form of mat, each fiber strand will normally consist of 200–400 or more filaments per strand. In stamping of glass fiber reinforced thermoplastic, however, extreme shear and mechanical working is not encountered, and the fiber bundles are not filamentized or broken up into the individual filaments. This is in distinction to thermoplastic fabricating processes such as injection molding or extrusion, in which the glass fiber strands are broken up into the individual filaments and dispersed into the matrix. The breaking up and dispersion of these filaments is an important factor in obtaining good properties, since adequate wetting and contact of each filament by the matrix is thereby achieved. In stamping of long-glass fiber-reinforced thermoplastics, however, extreme shear and mechanical working is not encountered. Rather, compressive stresses and mild, somewhat limited, translational motion of the reinforced thermoplastic is encountered. This results in flow of the entire filament bundle or strand rather than breaking up of the strand into the individual filaments. In a tight collection of many filaments, it is clear that many filaments will not be wetted by the thermoplastic matrix, resulting in poor mechanical properties.

SUMMARY OF THE INVENTION

In accordance with the present invention, I have discovered a method which facilitates transfer of heated or molten reinforced or short fiber reinforced or filled thermoplastic compositions to the molding apparatus. Compositions contemplated in accordance with the invention do not necessarily have to be in sheet form, e.g. the foil may be employed to support discrete granules or pellets, or cakes or logs, and yields products of improved mechanical properties, and of fabricating ease.

In essence, the thermoplastic composition which is to be stamped according to the method described above, are supported during the pre-heat and transfer stages by a thin, flexible metal foil. The foil may optionally serve a purpose as an integral part of the end product (on the surface or inside the final product), or it may be removed after stamping of the thermoplastic is completed, or it may be retained on the thermoplastic without serving any specific purpose.

The thermoplastic compositions, which may be filled or reinforced, are placed upon the metal foil support either before, during or after heating of the thermoplastic is initiated. The thermoplastic composition may be in the form of sheets, logs, rope, cylinders, spheres or irregularly shaped. The hot foil supported thermoplastic is transferred by means of the foil support to a shaping apparatus operated at temperatures between room temperature and 200° C., and rapidly stamped into a shaped object. The foil support may, but need not necessarily, become an integral part of the finished object. The foil support can optionally be removed prior to stamping of the thermoplastic part. The total stamping or shaping cycle time is kept below 30–40 seconds on even extremely large, intricately shaped objects.

During the transfer stage, the foil is readily clamped or otherwise held and moved to the press without disturbing the hot or molten thermoplastic composition. During the pre-heat stage, clamps, grids, point supports or similar devices need contact only the foil (but may also contact the entire structure), thus leaving the heated thermoplastic undisturbed. By appropriately selecting the foil characteristics, as herein disclosed, all of the desirable characteristics of the rapid stamping process are retained or improved.

It is an object of the invention to provide a novel, stampable thermoplastic composition in which the thermoplastic is supported during the pre-heat and transfer stages by a metal foil.

It is another object of this invention to provide glass fiber reinforced or filled thermoplastic sheets backed with a metal foil.

It is another object of this invention to yield stamped objects having a foil backing or overlay which serves a functional purpose (i.e. electrically or thermally conductive, paintable, decorative, magnetic, etc.).

It is another object of this invention to provide a practical means for transferring substantially molten thermoplastic sheets or bulk compositions from a heating oven to a stamping press.

It is another object of this invention to provide a means of rapid stamping a composite material in which the end-product is a thermoplastic metal foil laminate.

These and other objects and advantages of the invention will become evident from the specification and figures of the drawing.

BRIEF DESCRIPTION OF THE DRAWING

FIGS. 1a and 1b depict diagrammatically a thermoplastic composition supported on a metal foil; FIG. 1a illustrates a sheet composition and FIG. 1b an aggregate cake or particle form rather than sheet.

FIG. 2 illustrates schematically an alternate embodiment wherein the supporting metal foil is disposed between thermoplastic sheets.

FIG. 3 illustrates still a further embodiment wherein a thermoplastic composition in sheet form is employed in combination with aggregate or particle form.

FIG. 4 illustrates an embodiment wherein the thermoplastic is sandwiched between metal foil.

FIG. 5 is a schematic diagram of a process for continuously forming the shapable thermoplastic metal foil supported composition.

FIG. 6 is a schematic diagram of an alternate continuous processing arrangement.

FIGS. 7a and 7b illustrates a shape forming arrangement and product respectively.

DESCRIPTION OF THE PREFERRED EMBODIMENTS

In accordance with the invention, exceptionally good and easily handleable shaped products may be obtained from composite reinforced thermoplastic compositions which are transferred to shaping discs by means of a metal foil support. In particular, the metal foil should have a flexural modulus of less than $40 \times 10^6$ psi and a thickness which is a function of the flexural modulus of the foil and the thickness and modulus or stiffness of the thermoplastic composition but generally less than 0.004".

The foil or metal sheet may comprise a variety of metals such as aluminum, tin, copper, lead, silver, gold, magnesium, steel, nickel, and the like and various alloys thereof. The thickness of the foil as noted may range up to 0.004 inches or more, depending upon the stiffness (modulus) of the foil, the thickness of the thermoplastic layer, and the configuration of the final part. In general, the total composition may have an average thickness of at least 10 times as great as the thickness of the metal foil.

In accordance with this invention, it has been found for example, that in stamping of a thermoplastic part, reinforced or unreinforced, whose final average thickness is less than 0.060 inches, foils of 0.0025" or less are desirable. In stamping of parts whose final thickness is less than 0.125 inches, foils of 0.004" or less are preferable. In stamping of thermoplastic parts whose final thickness are greater than 0.125" foils up to 0.006" in thickness can be used. Moreover, if an excessively thick foil is used with any given thermoplastic sheet, either or both of the following may occur:

1. during stamping, the foil may disadvantageously "pop-up" or be exposed at the exterior surface of the thermoplastic part.
2. wrinkling of the foil develops, especially during shaping or stamping of complex parts; this causes surface imperfections in the final part.

It is evident that the allowable foil thickness is a function of the final part complexity, since thicker foils would be useable for simply contoured parts while possibly not suitable for complex parts. Also, the stiffness or modulus of the foil may affect the allowable maximum foil thickness, since stiffer metal foils would necessitate use of thinner foils. It will be apparent, therefore, that the foregoing stated limits on maximum foil thickness are meant to be illustrative only, and not limiting for any specific end-use case.

In selecting the foil support, however, it is noted that the foil should have a melting point significantly higher than the melting or softening range of the polymer composition. Thus, for example, foils consisting of a Wood's Metal or Lipowitz Alloy, both of which melt at approximately 70° C., would not be suitable for use as a support for most thermoplastics. White Metal, however, which melts at 238° C., may be a suitable foil support for polyethylene or polypropylene, which have melting ranges below 200° C., but not for nylon 6,6 which melts at 265° C.

Suitable thermoplastic materials which may be employed comprise a wide range of polymeric compositions. Included, for example, are olefinic polymers such as polyethylene, polypropylene, and copolymers and terpolymers thereof, e.g. copolymers of ethylene and ethyl acrylate, vinyl polymers comprising one or more of the following monomers: vinyl aryls such as styrene, O-phenylstyrene, m-phenylstyrene, p-phenylstyrene, O-methylstyrene, m-methylstyrene, p-phenylstyrene, o-methoxystyrene, m-methoxystyrene, p-methoxystyrene, o-nitrostyrene, m-nitrostyrene, p-nitrostyrene, and the like; vinyl and vinylidene halides, such as vinyl chloride, vinylidene chloride, vinylidene bromide, and the like; vinylesters such as vinyl acetate, vinyl propionate, vinyl butyrate, vinyl chloroacetate, vinyl benzoate, and the like; polycarbonates, that is, thermoplastics containing the following repeating unit:

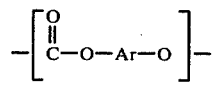

wherein Ar is the residue of an aromatic dihydric phenol; cellulosics, such as cellulose acetate, cellulose triacetate, cellulose acetate butyrate, cellulose propionate, ethyl cellulose, and the like; polyamides such as nylon 66, nylon 6, nylon 610, poly-m-xylylene, adipamide, polyhexamethylene terephthalamide, and the like; polyesters such as polyethylene terephthalate, polyethylene isophthalate, poly(ethylene-2,7-naphthamate), polybutylene terephthalate, various copolymers thereof, and the like; chlorinated polyethylene, chlorinated polyvinyl chloride, polyfluoroethylene, polytrifluorochloroethylene, polyhexafluoropropylene, and various copolymers and terpolymers thereof, as for example, copolymers of vinylidene fluoride and trifluorochloroethylene, and the like.

Other polymers which can be utilized include polyurethane resins, polysulfone resins, polyacetal resins, halogenated olefins, phenoxy resins. Also included in the term "polymer" are blends of two or more polymeric materials. Illustrative of such blends are polyethylene/polypropylene, ethylene-acrylic acid vinylacetate terpolymers and the like.

Also contemplated within the term "polymer" are the metallic salts of those polymers or blends thereof which contain free carboxylic acid groups. Examples of such polymers include ethylene-acrylic acid copolymers and ethylene-methacrylic acid copolymers. Illustrative of the metals which may be used to provide the salts of such carboxylic acid polymers are the 1, 2 and 3 valent metals such as sodium, calcium and aluminum.

The polymers may be modified with additives such as plasticizers, heat and light stabilizers, impact modifiers, lubricating agents, etc.

The polymer of choice may be reinforced with fibrous reinforcement, as for example, glass fibers, metal fibers, carbon fibers, sapphire or alumina whiskers, jute, hemp, sisal, or thermoplastic or thermosetting fibrous materials, such as nylon, rayon polyester and the like. The fibrous reinforcement may be in the form of chopped yarn, roving, scrim, woven cloth, woven roving, nonwoven mat, or the like and may be of average length 0.005" to continuous. The fibrous reinforcement may comprise 0 to 40% by weight of the total thermoplastic fiber composite.

The polymer of choice may also be loaded with particulate filler. Such fillers may be selected from a wide variety of minerals, metals, metal oxides, siliceous materials, metal salts, and mixtures thereof. These fillers may optionally be treated with various coupling agents or adhesion promoters, as is known to those skilled in the art. Advantageous physical properties are achieved if the filler material has a Young's modulus of $10^7$ psi or greater and at least a Young's modulus twice as great as that of the polymer. Examples of fillers included in these categories are alumina, aluminum hydrates, feldspar, asbestos, talc, calcium carbonates, clay, carbon black, quartz, novaculite, and other forms of silica, kaolinite, bentonite, garnet, saponite, beidellite, calcium oxide, wollastonite, calcium hydroxide, etc. The fillers listed above are given as examples only and are not intended as a limitation on fillers that can be utilized in the invention.

In addition to a fiber reinforced thermoplastic and a particulate filler loaded thermoplastic, the thermoplastic may be reinforced with a mixture of fiber and/or filler. Also, the fiber or fillers may be coated with mixing agents, coupling agents, adhesive promoters, wetting agents and the like, as are known to those skilled in the art.

The method of utilization of the foil supported thermoplastic composition may take the following steps:

The thermoplastic composition which may be in sheet form, in bulk form, in pellet or aggregate form, or in a preblanked form (i.e. out to a specific desired size or configuration) is placed upon the metal foil. The foil and thermoplastic are then heated together to above the softening or melting point of the thermoplastic. During heating and the ensuing transfer to the stamping press, the foil (not the polymer) is supported on spaced rods, a flat (optionally heated) surface, point supports, or held between clamping devices or other means of support. It is important to note that the supporting or clamping devices may contact only the foil, and not the thermoplastic. The foil and hot thermoplastic are then transferred to a stamping press, placed into the matched mold, and stamped into shape as described previously. During the heating and transfer stages, the thermoplastic does not necessarily contact either the supports or the transferring device, thus avoiding contact and premature cooling or injury or distortion of the hot thermoplastic. Thereafter, the thermoplastic composition is ejected under pressure either from an injection molding machine, an extruder, a pressurized holding tank, or similar device onto the metal foil. The thermoplastic composition may be extruded in sheet form, in cylindrical or strand form, in pellet form, or as an irregularly shaped ball or lump. In the rapid stamping of a long relatively thin object, it would be suitable to extrude a long, thin cylinder sheet, or log onto a long, thin metal foil support. If the thermoplastic is maintained in a heated state, further heating of the material is not required and the thermoplastic foil can be transferred to the stamping press as described. Heating of the thermoplastic thus occurs inside of the injection machine or extruder barrel instead of by auxiliary means.

In addition to the primary support function of the foil during the transfer and pre-heat stages, the foil may additionally function as: (1) reinforcement, increasing the strength, stiffness and heat and impact resistance of the final composition; (2) barrier, inhibiting contact and/or transfer of vapor, gas, or liquid with or through the thermoplastic material; (3) a high energy surface, favorable for bonding and painting; (4) decorative, becoming part of the finished surface; (5) electrical, magnetic or similar conductive or ground functions. In addition to such obvious electrical functions, the conductivity of the foil may aid painting by such methods as electrocoating, electroplating, powder deposition, electrostatic painting, etc. by serving to attract oppositely or positively charged paint particles to the polymer surface.

If such extra functions on the part of the foil are not needed, the foil may be stripped or removed from the formed part after stamping, or left on if desired. If removal of the foil is desired, lubricants, oils, greases, or slip agents may be coated onto the foil or added to the thermoplastic composition.

The invention is further described by reference to the drawing.

Illustrated in FIG. 1a is a diagram which represents a means of handling a thermoplastic sheet composition prior to, during and after the heating stage of the forming process. The thermoplastic sheet 10 may be bonded or laminated to the foil support 11 or may be merely placed upon it. An excess length of foil at the ends of the sheet is desirable (although not absolutely necessary) so that during the transfer and/or heating stages, clamping or handling devices will contact only the foil, and not the thermoplastic composition.

In FIG. 1b, a means of handling a bulk thermoplastic composition 12 is represented. As stated hereinabove, the molten bulk material 12 may be extruded or injected onto the foil 13 or a "cold" charge may be placed onto the foil and then heated to the melting point.

FIG. 2 is an alternate scheme similar to FIG. 1a, except that thermoplastic sheets 14 and 16 are present on both sides of the foil support 15. In this embodiment, the bottom thermoplastic sheet 16 must be bonded, laminated, or otherwise adhered to the foil 15, although the top thermoplastic layer 14 may be only placed on top of the foil. The two thermoplastic sheets 14 and 16 need not be of equal thickness or composition.

FIG. 3 is a scheme similar to FIG. 2, except that the top thermoplastic charge 17 is now in bulk rather than sheet form. The foil 18 and thermoplastic sheet 19 function as 15 and 16, respectively.

FIG. 4 is a diagram of a thermoplastic sheet composition 21 having both sides of the sheet 21 attached to a foil, i.e. the thermoplastic is sandwiched between sheets of metal foils 20 and 22. Either the top or bottom foil can be used as the actual physical support sheet. The two foils 20 and 22 need not be identical in thickness or composition.

FIG. 5 is a schematic representation of a process for manufacturing continuously the produce of FIG. 4. The arrangement comprises an extruder 25 to yield the thermoplastic composition 26 and one or two sources of metal foil 28 and 29 in combination with compression rollers 30 and 31. The finished laminate may be rolled up, as shown at 32 or cut into sheets without rolling up.

In FIG. 6, a schematic representation of a process which can be used to make the product of FIG. 2 is illustrated and comprises extruders 35 and 36, yielding thermoplastic composition at 37 and 38, respectively, which sandwich therebetween with the end of rollers 39 and 40, a foil 41 fed from supply roll 42. The thermoplastic shapable product is shown stored at 43.

In FIG. 7a, a method of forming the foil supported compositions of this invention into shaped objects is illustrated. The heated thermoplastic composition 45, represented in this figure by a sheet material, is transported and placed by means of the foil 46 substrate into the matched metal dies 47 and 48 of a stamping press. After closing of the dies and solidification of the thermoplastic, the shaped product is shown in FIG. 7b. The foil 46 may become an integral part of the final object.

The following examples will serve to illustrate the principles described above.

EXAMPLE 1

A mixture of 39% by weight nylon-6, 39% kaolin of mean particle size 9 microns, and 22% glass fibers were extruded into sheets 0.046" thick. Two such sheets were juxtaposed on either side of a chopped glass mat (2" chopped glass fibers) and compression molded to form a final mixture containing 10% glass mat, 20% short glass fibers and 35% each of nylon-6 and kaolin. A sheet of this material, 0.10" thick × 8" wide × 12" long was placed on an 0.001" thick, clean aluminum foil support measuring 8¼" wide × 12½" long. The foil was clamped along two opposite edges by a standard clamping device, and the thermoplastic foil composite sheet was heated in an infrared oven to above the melting point of the polymer. The heated laminate was then transferred to the heated matched dies (130° C.) of a modified 200 ton Niagara metal stamping press, and stamped into a shallow tray approximately 1½" high × 5" wide and 9" long. The part was ejected from the press 10 seconds after press closure.

With the male part of the matched die set positioned on the stationary bottom portion of the press, the aluminum support sheet was integrally formed and bonded into the interior of the stamped tray.

EXAMPLE 2

The experiment of Example 1 was repeated, except that the female portion of the matched die set was placed upon the stationary bottom portion of the press, and the male portion was now positioned on the moving ram. The heated thermoplastic foil composition was transferred and stamped as explained previously. The aluminum support sheet was now integrally bonded to the exterior side of the stamped tray.

EXAMPLE 3

The procedure of Example 2 was repeated with the following exception. After transferring the heated thermoplastic sheet by means of the foil support into the dies of the stamping press, a 0.001" thick aluminum foil was placed over the top of the hot thermoplastic sheet composition. The three-layered laminate (foil/thermoplastic/foil) was stamped as previously described. The finished tray now possessed foil covered exterior and interior surfaces.

EXAMPLE 4

The procedure of Example 1 was repeated, except that prior to placing the cold thermoplastic composite sheet upon the metal foil, the foil was coated with a fluorocarbon mold release agent. The foil-thermoplastic laminate was stamped as described. After the tray was formed, the aluminum face sheet was easily peeled from the thermoplastic, leaving a metal-free reinforced thermoplastic tray.

EXAMPLE 5

A composition of 30% by weight talc, mean particle size 2 microns, and 70% by weight polypropylene was extruded in a 3½" Prodex Extruder. The extrudate, exiting from a large diameter cylindrical die, was a 1½" diameter cylindrical "log". The log was collected as a 3" wide × 10" long, clean copper foil strip 0.0025" thick. After a 10" long log had been deposited on the cool foil, the foil was picked up manually at the edges and transferred to the matched dies positioned in the stamping press as described in the previous examples. Stamping was accomplished in the same manner as described (Example 1) except that the residence time in the mold of the stamped section was increased to fifteen seconds.

After removal of the tray, it was observed that the copper strip was embedded in the center of the inside face of the tray.

EXAMPLE 6

The procedure of Example 1 was repeated, except that the thermoplastic was a pure nylon-6,6 (unreinforced) composition. Also, the aluminum foil had imprinted on the bottom, non-contact side a wood-grain effect. After stamping of the foil-thermoplastic sheet as described previously, the wood-grain foil was integrated into the interior of the tray. Painting or further finishing of the inside of the tray was thus not required.

EXAMPLE 7

The exterior of the specimen of Example 6 was painted by electrostatic (dry) painting. An electric ground was applied to the inside, metal foil side of the formed tray.

Powdered white epoxy paint, sprayed through a DeVilbiss electrostatic gun, was charged to 100,000 volts and sprayed towards the grounded surface. Attraction to the foil-backed polymer surface was excellent. The paint was cured for five minutes at 200° C., and the result was a tray having a painted white exterior and a wood-grained metal foil interior.

EXAMPLE 8

The procedure of Example 1 was repeated, except that the foil backing was a steel sheet 0.00015" thick. All procedures and results were as described in Example 1.

EXAMPLE 9 (COMPARATIVE)

A mixture of nylon-6 reinforced with 30% short (i.e. 0.020"–0.100" average length) glass fibers was compression molded into sheets 8" wide × 12" long × 0.100" thick. One such sheet was placed upon a 0.001" aluminum foil support as in Example 1, and handled and stamped readily as in that Example. The processing of another such identical sheet was attempted, except that the metal foil support was not used. The reinforced thermoplastic sheet was held by both clamps and supporting rods in the heating oven. Prior to transfer of the composition to the stamping press, however, the sheet had virtually disintegrated into several separate molten, dripping sections. Transfer of the sheet to the press was therefore not possible in a practical sense.

EXAMPLE 10

A pelletized mixture of 30% by weight wollastonite filled nylon-6 was placed uniformly on a 0.0015" tin foil support. Each pellet was approximately ⅛" in diameter and ¼" long. The pellet-foil composition was placed on a tray in an infrared oven for 60 seconds, after which the total composition was transferred by means of the foil to the stamping apparatus as described in Example 1. A well-formed tray was obtained after 10 seconds in the stamping press. The thickness of the tray so obtained was able to be varied by varying the amount of pellet charge. Without use of the foil support, it becomes apparent that, the pelletized thermoplastic mixture could not be utilized in the stamping operation.

EXAMPLE 11 (COMPARATIVE)

The experiment of Example 1 was repeated, except that the use of the metal foil support was omitted. The reinforced polymer sheet was placed upon ⅛" diameter rod supports spaced 2" apart in an infrared oven. After a 60 second heating period, the molten sheet was clamped at the edges by stainless steel clamps, and transferred to the stamping press as described previously. After ejection of the shaped tray from the press, the results of utilizing the rod supports and clamp transferring means were readily observable. Severe depressions and surface alterations were readily noticeable at the points of contact of the plastic sheet with both the rod supports and the clamps. These imperfections were not "ironed out", i.e. eliminated, during the clamping cycle of the product. The surface quality and utility of the final product was, in fact, impaired by using a support and transferring means of this kind.

Various modifications apparent to those skilled in the art may be made without departing from the scope or spirit of the invention. Such modification, except as precluded by the claims, is within the purview of the invention.

I claim:

1. A method of making stamped articles of thermoplastic composition having a removably adhering metal foil supporting layer, where the total average thickness of the thermoplastic article plus the metal foil layer is at least ten times as great as the thickness of the metal layer, comprising the steps of:
   placing the thermoplastic composition on the metal foil layer prior to heating, the metal foil having a flexural modulus of less than $40 \times 10^6$ psi, the thickness of the foil being:
   0.0025 inches or less when the total average thickness of the thermoplastic article plus the metal foil is less than 0.060 inches,
   0.004 inches or less when the total average thickness is less than 0.125 inches, and
   0.006 inches or less when the total average thickness is greater than 0.125;
   preheating the metal foil and thermoplastic composition located and supported upon the metal foil to above the softening point of the thermoplastic composition;
   transferring the preheated metal foil and thermoplastic composition located and supported upon the metal foil to a stamping press;
   stamping the metal foil and thermoplastic composition located on the metal foil in a stamping press whereby the stamped article is formed.

2. The method as recited in claim 1 wherein the preheated metal foil and thermoplastic composition located and supported upon the metal foil are supported by a support means which contacts only the metal foil and not the thermoplastic composition.

3. The method as recited in claim 1 further comprising the step of removing the foil from the stamped article.

4. The method of claim 1 in which the metal foil subsequently becomes an integral part of the finished laminated structure.

5. The method of claim 1 in which the metal foil is subsequently removed from the finished structure.

6. The method of claim 1 in which the thermoplastic composition is in sheet form.

7. The method of claim 1 in which the thermoplastic composition is in bulk form.

8. The method of claim 1 in which the thermoplastic composition is in particulate form.

9. The method of claim 1 in which the thermoplastic is reinforced with both fibrous reinforcement and particulate filler.

10. The method of claim 1 in which the thermoplastic polymer is nylon 6.

11. The method of claim 1 in which the thermoplastic polymer is nylon 6,6.

12. The method of claim 1 in which the thermoplastic polymer is polypropylene.

13. The method of claim 1 in which the thermoplastic polymer is supported upon an aluminum foil sheet.

14. The method of claim 1 in which the thermoplastic polymer is supported upon a steel foil sheet.

15. The method of claim 1 in which the thermoplastic is reinforced with fibrous reinforcement.

16. The method of claim 7 in which the thermoplastic contains a particulate loading agent.

17. The method of claim 15 wherein the fibrous reinforcement is glass fiber.

18. The method of claim 17 wherein the glass fiber filler has a length not exceeding about one-half inch.

* * * * *